H. F. O'BRIEN.
SYSTEM OF CONTROL.
APPLICATION FILED OCT. 29, 1920.
1,437,070.
Patented Nov. 28, 1922.
2 SHEETS—SHEET 1.
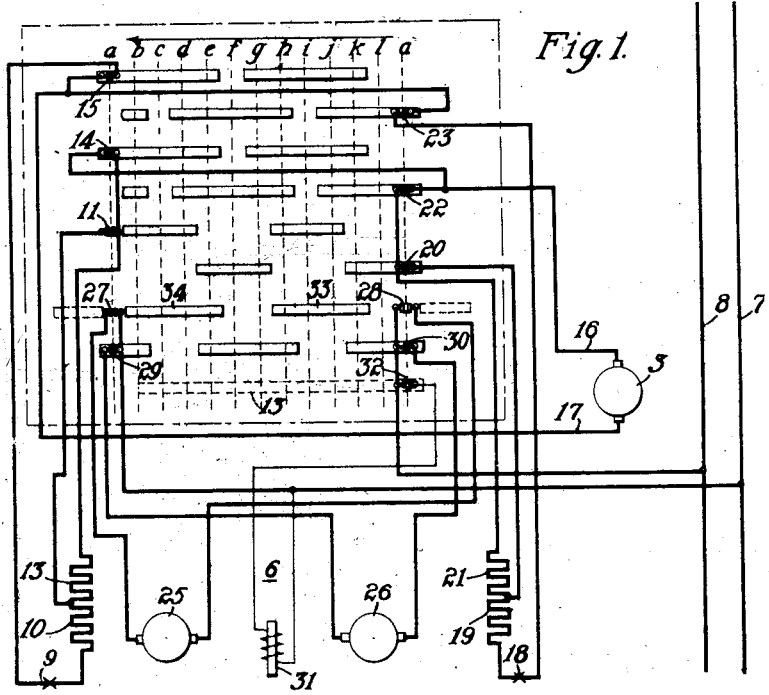
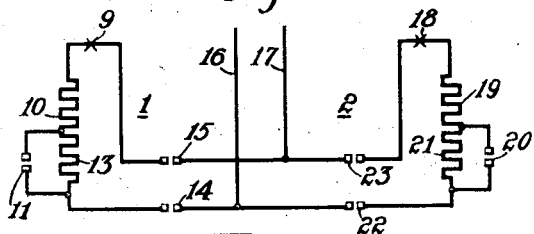
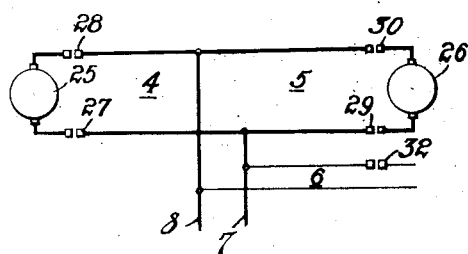
WITNESSES:
H. T. Shelhamer
W. R. Coley
INVENTOR
Harold F. O'Brien
BY
Wesley G. Carr
ATTORNEY

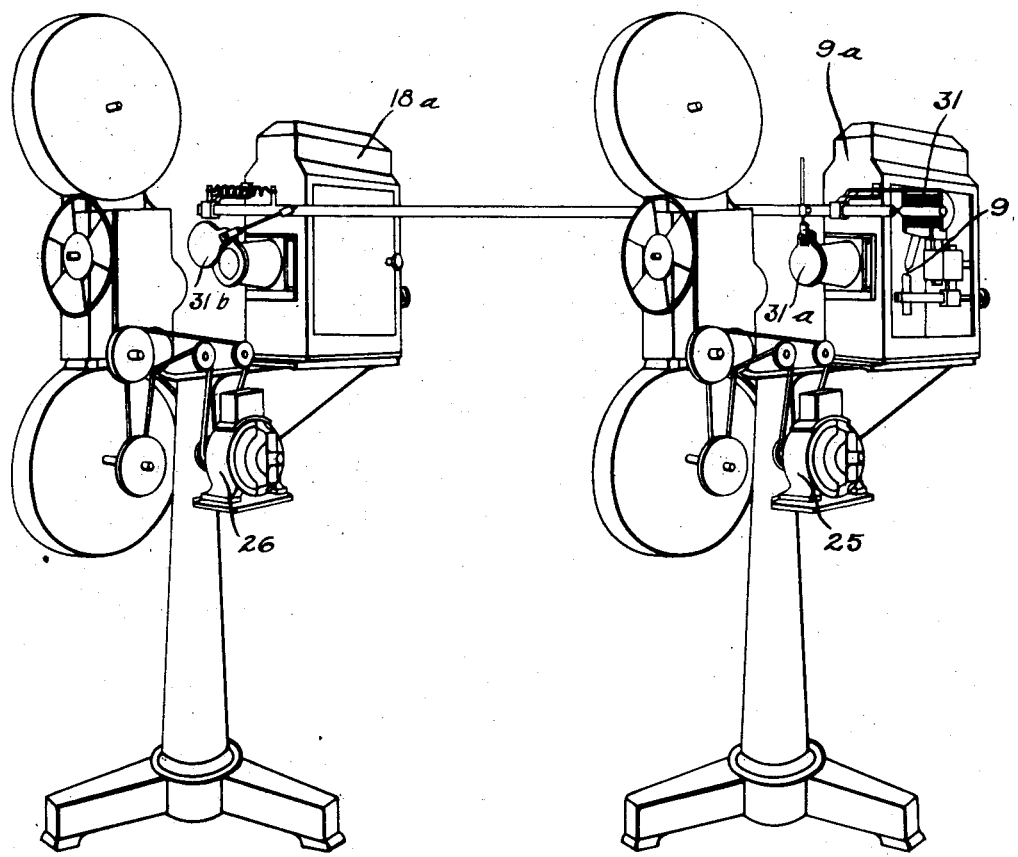

Patented Nov. 28, 1922.

1,437,070

UNITED STATES PATENT OFFICE.

HAROLD F. O'BRIEN, OF LOS ANGELES, CALIFORNIA, ASSIGNOR TO WESTINGHOUSE ELECTRIC AND MANUFACTURING COMPANY, A CORPORATION OF PENNSYLVANIA.

SYSTEM OF CONTROL.

Application filed October 29, 1920. Serial No. 420,399.

*To all whom it may concern:*

Be it known that I, HAROLD F. O'BRIEN, a citizen of the United States, and a resident of Los Angeles, in the county of Los Angeles and State of California, have invented a new and useful Improvement in Systems of Control, of which the following is a specification.

My invention relates to a system of control and it has special relation to a control system used in connection with electrically operated motion-picture machines.

The object of my invention is to provide a system of control whereby the proper sequence of operation is assured in effecting the electrical changes necessary in changing from one projection machine to another, without interrupting the operation of the motion-picture system as a whole.

It is common practice to control the electrical circuits of a motion-picture machine by means of switches mounted on an open-face switch board. In changing from one projection machine to another, an operator must throw from 4 to 6 switches in proper sequence.

According to my invention, I provide a system of control which will insure, at all times, a proper sequence in effecting the desired cycle of operations.

In the accompanying drawings,

Fig. 1 is a diagrammatic view of the circuits and apparatus embodying my invention.

Fig. 2 is a schematic diagram of the arc circuits.

Fig. 3 is a schematic diagram of the motor circuits.

Fig. 4 is a chart showing the sequence of operation of the switches.

Fig. 5 is a plan view of the controller shown in Fig. 1.

Fig. 6 is an elevational view of a pair of moving-picture machines equipped according to one form of my invention.

Referring particularly to Figs. 1, 2 and 3, the system shown comprises arc circuits 1 and 2, connected, in parallel relation, to a source of direct current, such, for example, as a direct-current generator 3, and motor circuits 4 and 5 and a shutter circuit 6 that are connected, in parallel relation, to conductors 7 and 8 of an alternating-current supply circuit.

The circuits of each projection machine comprise an arc circuit and a reel-motor circuit, while the shutter circuit 6 is common to the several projection machines. Arc circuit 1 comprises an arc 9, which is enclosed within a suitable projector $9^a$ (see Fig. 6), a resistor 10, a switch 11 for shunting a portion 13 of resistor 10 and switches 14 and 15 for connecting the arc circuit 1 to conductors 16 and 17 of the direct-current supply circuit.

Arc circuit 2 comprises an arc 18, which is enclosed within a suitable projector $18^a$ (see Fig. 6), a resistor 19 in series with the arc, a switch 20 for shunting a portion 21 of resistor 19 and switches 22 and 23 for connecting said circuit to leads 16 and 17 of the direct-current supply circuit.

Motor circuits 4 and 5 comprise reel motors 25 and 26 and switches 27, 28 and 29, 30, respectively.

The shutter or "douser" circuit 6 includes an electro-magnet 31 for alternatively opening and closing the respective "dousers" $31^a$ and $31^b$ (see Fig. 6), and a switch 32 for controlling the circuit of the energizing coil of the electro-magnet 31.

The controller development shown in Fig. 1 may be that of a controller of either the drum type or the cam type. The lines designated by letters represent successive operating positions of the controller for one complete rotation of the drum. The lengths of the contact segments; for example, 33 and 34, indicate the operative positions in which the corresponding switches are closed, while the spaces between the pairs of segments indicate the operative positions in which the corresponding switches are open.

Referring to Fig. 5 of the drawing, movement of a handle 36 between the stop members 37 and 38 actuates the controller drum from one operative position to another. The stop members 37 and 38 prevent the actuation of the drum beyond the succeeding operative position. The drum and the handle 36 are operatively connected by means of a ratchet wheel 39 and a pawl 40.

The mode of operation of the system is as follows: When the drum is in the position $a$, a circuit is completed which extends from the generator 3, through switch 23, arc 18, a portion of resistor 19 and switches 20 and 22, to the generator 3. Another circuit is completed which extends from the generator 3, through switch 15, arc 9, resistor 10 and switch 14 to the generator 3. During this period, current also traverses motor circuit 5. For this position of the controller, the projection machine, corresponding to arc 18 and motor 26, is operating under normal conditions, while, at the same time, a current of substantially one-half normal value traverses arc 9.

Upon a further movement of the drum to position $b$, portion 13 of resistor 10 is shunted by switch 11, thus permitting current of normal value to traverse arc 9. Switch 20 is opened to insert resistor 21 in arc circuit 2, and switches 27 and 28 are closed, completing motor circuit 4. Switch 32 is also closed at this time, allowing the electro-magnet 31 to open the shutter $31^a$ on the projection machine, corresponding to arc 9, and to close the shutter $31^b$ on the projection machine corresponding to arc 18.

Position $c$ corresponds to the normal running position for the projection machine corresponding to arc 9. When the controller occupies this position, arc circuit 1 and reel-motor circuit 4 are closed by switches 14, 15, and 27, 28, respectively. At the same time, arc circuit 2 and reel-motor circuit 5 are opened by switches 22, 23, and 29, 30, respectively.

Upon a further movement of the drum to position $d$, a circuit is completed through arc 18 by the closing of switches 22 and 23. This position corresponds to the warming-up period for arc 18.

Position $e$ of the controller corresponds to the transition period during which the projection machine corresponding to arc 18 and reel-motor 26 becomes operative and the projection machine corresponding to arc 9 and motor 25 becomes inoperative. In this position of the controller, switch 11 is opened to insert a portion 13 of resistor 10 in arc circuit 1, switch 20 is closed to shunt a portion 21 of resistor 19, and motor circuit 5 is completed by the closing of switches 29 and 30. Switch 32 is also opened at this time, permitting the electro-magnet 31 to open the shutter $31^b$ on the projection machine corresponding to arc 18 and to close the shutter $31^a$ on the projection machine corresponding to arc 9.

Position $f$ on the drawing corresponds to the normal running position for the projection machine utilizing arc 18 and motor 26. In this position of the drum, arc circuit 1 and motor circuit 4 are opened by switches 14, 15, and 27, 28, respectively.

The cycles of operation for the remaining drum positions $g$, $h$, $i$, $j$, $k$, and $l$ correspond, respectively, to the previous drum positions $a$, $b$, $c$, $d$, $e$ and $f$. That is, for a futher movement of the drum from position $g$ to position $l$, the switches closed for the positions $g$, $h$, $i$, $j$, $k$ and $l$ correspond, respectively, to those closed for the positions $a$, $b$, $c$, $d$, $e$ and $f$.

It is evident that a great variety of controllers may be employed to bring about the cycle of operations embodied in my invention. The controller which I have shown for bringing about the desired cycles of operation is extremely simple in construction and I have omitted all special features which are not necessary to a clear understanding of the invention. I desire, therefore, that only such limitations shall be imposed thereon as are indicated in the appended claims.

I claim as my invention:

1. In a motion-picture-machine system, the combination with a plurality of projecting machines having arc circuits, of means comprising a controller and power-absorbing devices for maintaining the total power consumed in said arc circuits substantially constant during the successive operation of said projecting machines.

2. In a motion-picture-machine circuit, the combination with a plurality of arc circuits, a plurality of motor circuits and a shutter controller circuit, of means for controlling said circuits according to a pre-determined cycle only, said controlling means comprising means for effecting the operation of said arc circuits at a plurality of different loads.

3. In a motion-picture-machine circuit, the combination with a plurality of arc circuits, a plurality of motor circuits and a shutter-controlling circuit, of means for operating said arc circuits at partial or at full load and a switching mechanism for operating all of said circuits according to a pre-determined cycle only.

4. In a motion-picture-machine circuit, the combination with a plurality of arc circuits, a plurality of motor circuits, and a shutter-controlling circuit, of a switching device for controlling all of said circuits and comprising a rotatable member and a stationary member whereby a movement of the rotatable member will control said circuits according to a predetermined cycle only, said switching device comprising co-operating contact members for effecting the operation of said circuits at different loads.

5. In a motion-picture-machine circuit, the combination with a plurality of arc circuits, a plurality of motor circuits, and shutter-controlling circuit, of a switching device for controlling all of said circuits and comprising a rotatable member and a stationary member, whereby rotation of the movable member causes said circuits to be opened and closed according to a predetermined cycle only, said switching device comprising co-operating contact members for effecting the operation of each of said arc circuits at full and at partial load.

6. A motion-picture-machine circuit comprising a plurality of arc circuits, resistors connected in circuit with the arcs, a plurality of motor circuits, a shutter-controlling circuit and a single rotatable switching mechanism for insuring that said circuits shall be energized according to a predetermined cycle only, said switching mechanism embodying co-operating contact members for effecting the operation of each of said arc circuits at full and at partial load and for effecting intermittent operation of said shutter-controlling circuit dependent upon the condition of said arc circuits.

7. A motion-picture-machine system comprising a plurality of motion-picture machines, an arc circuit and a motor circuit for each of said machines and a single rotatable switching mechanism comprising co-operating contact members for successively effecting the operation of an arc circuit and a motor circuit at substantially normal loads and a second arc circuit at partial load, the operation of the second arc circuit and a second motor circuit at normal loads, the opening of the first arc circuit and the first motor circuit and then, in successive operations, retransferring the load back to the first arc and motor circuit.

8. The combination with a plurality of motion-picture machines severally comprising light and motor circuits, of a single rotatable switching device comprising co-operating contact members for successively effecting the operation of a light circuit and a motor circuit under normal conditions and a second light circuit under light-duty conditions, the operation of the second light circuit and a second motor circuit under normal conditions, the opening of the first light circuit and the first motor circuit and then successively retransferring the load back to the first light and motor circuit.

9. The combination with a plurality of motion-picture machines severally comprising arc and motor circuits, of a single rotatable switching device comprising co-operating contact members for successively effecting the operation of an arc circuit and a motor circuit at substantially normal loads and a second arc circuit at a "warming" load only, the operation of the second arc circuit and a second motor circuit at substantially normal loads, the opening of the first arc circuit and the first motor circuit and then successively retransferring the load back to the first arc and motor circuits.

10. The combination with a plurality of motion-picture machines severally comprising arc and motor circuits and a shutter circuit, of a single rotatable switching device comprising co-operating contact members for successively effecting the operation of an arc circuit and a motor circuit at substantially normal loads and a second arc circuit at substantially one half-load for "warming" purposes, the operation of the shutter circuit to open the shutter circuit to open the shutter corresponding to the first arc circuit, the operation of the second arc circuit and a second motor circuit at substantially normal loads, the opening of the first arc circuit and the first motor circuit, the operation of the first arc circuit at substantially half-load for "warming" purposes, reversing the operation of the shutter circuit and again operating the first arc circuit and the first motor circuit at substantially normal loads.

11. In a motion-picture-machine circuit, the combination with a plurality of light circuits, a plurality of motor circuits and a shutter-controlling circuit, of means for controlling said circuits according to a predetermined cycle only, said controlling means comprising means for effecting the operation of said light circuits at a plurality of different loads.

12. In a motion-picture-machine circuit, the combination with a plurality of light circuits, a plurality of motor circuits and a shutter-controlling circuit, of means for operating said light circuits at partial or at full load and a switching mechanism for insuring the operation of all of said circuits according to a predetermined cycle only.

13. In a motion-picture-machine system, the combination with a plurality of projecting machines having light circuits, of means comprising a controller and translating devices for maintaining the total power consumed in said light circuits substantially constant during the successive operation of said projecting machines.

14. In a motion-picture-machine system, the combination with a plurality of projecting machines having arc circuits, a resistor in circuit with each arc, and means for alternately excluding portions of said resistor from circuit to maintain one arc partially operative during the normal operation of another.

15. In a motion-picture-machine system, the combination with a plurality of projecting machines having arc circuits, and means for selectively rendering one or the other of said arc circuits alone and fully operative, or for rendering either arc circuit fully operative and the other partially operative at the same time.

16. In a motion-picture-machine system, the combination with a plurality of projecting machines having arc circuits, a resistor in circuit with each arc, means for selectively energizing either if said arc circuits and a portion of the corresponding resistor to render the arc alone and fully operative, and means for energizing either arc circuit and a portion of the corresponding resistor and the other arc circuit and entire resistor to render the former arc fully operative and the latter arc partially operative at the same time.

In testimony whereof, I have hereunto subscribed my name this 22nd day of September, 1920.

HAROLD F. O'BRIEN.